(12) United States Patent
Mürdter

(10) Patent No.: US 6,900,396 B2
(45) Date of Patent: May 31, 2005

(54) DEVICE FOR HANDLING INDIVIDUAL PROCESSES

(75) Inventor: Herbert Mürdter, Albstadt (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 0 days.

(21) Appl. No.: 10/344,831

(22) PCT Filed: Jul. 26, 2001

(86) PCT No.: PCT/EP01/08675
§ 371 (c)(1),
(2), (4) Date: Jul. 21, 2003

(87) PCT Pub. No.: WO02/15644
PCT Pub. Date: Feb. 21, 2002

(65) Prior Publication Data
US 2004/0026133 A1 Feb. 12, 2004

(30) Foreign Application Priority Data
Aug. 14, 2000 (DE) .......................... 100 39 705

(51) Int. Cl.⁷ .............................................. G01G 19/00
(52) U.S. Cl. ................... 177/25.13; 340/666; 702/173; 705/414
(58) Field of Search .......................... 177/25.11–25.17, 177/25.19; 340/666; 705/16, 414; 702/173

(56) References Cited

U.S. PATENT DOCUMENTS

| | | | | |
|---|---|---|---|---|
| 4,728,922 A | * | 3/1988 | Christen et al. ............. 340/991 |
| 5,125,465 A | | 6/1992 | Schneider ..................... 177/50 |
| 5,209,312 A | * | 5/1993 | Jensen ......................... 177/136 |
| 5,227,614 A | | 7/1993 | Danielson et al. ........... 235/380 |
| 5,416,706 A | * | 5/1995 | Hagenbuch ................... 701/50 |
| 5,629,498 A | * | 5/1997 | Pollock et al. ................ 177/15 |
| 5,923,001 A | * | 7/1999 | Morris et al. ................ 177/245 |
| 6,157,824 A | * | 12/2000 | Bailey ......................... 455/409 |
| 6,191,691 B1 | * | 2/2001 | Serrault .................... 340/572.8 |
| 6,263,316 B1 | * | 7/2001 | Khan et al. ................... 705/13 |
| 6,366,220 B1 | * | 4/2002 | Elliott ......................... 340/928 |
| 6,649,848 B2 | * | 11/2003 | Kriger ..................... 177/25.13 |

FOREIGN PATENT DOCUMENTS

| | | |
|---|---|---|
| DE | 4139493 | 6/1993 |
| EP | 0176242 | 4/1986 |
| EP | 0295658 | 12/1988 |
| EP | 0380082 | 8/1990 |
| GB | 2252188 | 7/1992 |
| WO | 9926185 | 5/1999 |

OTHER PUBLICATIONS

Patent Abstracts of Japan, vol. 1998, No. 09, Jul. 31, 1998 & JP 10 104277 A (Kokusai Electric Co. LTD) , Apr. 24, 1998.
Patent Abstracts of Japan, vol. 2000, No. 06, Sep. 22, 2000 & JP 2000 090384 A (Yokogawa Electric Corp) , Mar. 31, 2000.

* cited by examiner

*Primary Examiner*—Randy W. Gibson
(74) *Attorney, Agent, or Firm*—Friedrich Kueffner

(57) ABSTRACT

The invention pertains to a device, especially a measuring device, for handling individual processes, in the course of which at least one value is generated, with a characterization unit, which can be operated to generate characterizing signals for characterizing the individual processes, and with a unit for assigning the values generated during the handling of the individual processes to the processes characterized by the characterizing signals, where the characterization unit has a receiver for receiving the identification signals which are generated in the vicinity of the device during the handling of the individual processes and which identify the processes, on the basis of which identification signals the characterizing signals are generated

14 Claims, No Drawings

DEVICE FOR HANDLING INDIVIDUAL PROCESSES

The invention pertains to a device, especially a measuring device, for handling individual processes in the course of which at least one value is generated, with a characterization unit which can be operated to generate characterizing signals for characterizing the individual processes and with a unit for assigning the values generated during the handling of the individual processes to the processes characterized by the characterizing signals.

During the handling of individual measuring processes by means of measuring devices of the type described above, the standard practice is to conduct a plurality of measurements, whereupon the measurement results or values or the values generated on the basis of these measurement results must be assigned to individual processes. The processes can be assigned to individual users, for example. This means that the results of all the measurements conducted by one user of the device are assigned to a common process. In addition, however, the individual measurements can also be assigned to certain measuring procedures, in the course of which several users operate the same device. In both cases, the characterizing unit of the known devices of the type described above usually comprises an input keyboard, by the actuation of which the characterizing signals which characterize the individual processes are generated, a predetermined key of the input keyboard being assigned to each process. The individual keys can be assigned to certain users of the device or possibly to certain operating procedures.

The devices discussed above are operated as just described in conjunction with, for example, the use of price-calculating shop scales. Devices of this type can be used in, for example, self-service stores with various sales islands for cheese, fresh meat, fruit, vegetables, etc., where individual products are sold with the assistance of a sales clerk. Several sales clerks will normally use the same scale. It can occur that, after one of the clerks has weighed and entered a first product for his/her current customer and has started to prepare the next item for weighing, another clerk can weigh up a product for a different customer on the same scale just used by the first clerk. To complete the sub-process of the total sales process for the customer in question, the clerk actuates his/her clerk key. As a result, a characterizing signal is generated, on the basis of which the result of the weighing operation and the purchase price calculated on the basis of that weight are assigned to the sales process just completed by the clerk, i.e., to the sales process assigned to the customer in question. A sequence of this type can be repeated several times in the course of several different overlapping sales processes. When the customer is finished, the clerk terminates the process assigned to this customer. This is usually done by actuation of a certain key (e.g., the "Total" key) on the input keyboard of the device and by actuation of the clerk key, by means of which, again, a characterizing signal is generated, which makes it possible for the termination signal generated by the actuation of the key in question to be assigned to this process.

If the scale is integrated into a network, the clerk can, if his/her own scale is occupied at the moment in question or if it seems more practical to him/her for other reasons to do so, use one of the other scales to handle individual sub-processes. When other scales are used, the values generated in the course of the sub-processes, such as the weight values or the purchase prices, are also assigned to the sales process just then handled by the clerk in question by actuation of the corresponding clerk key and by generation of corresponding characterizing signals.

The procedures explained on the basis of the example of a shop scale also occur in similar form in the case of measuring devices other than shop scales, such as devices used in laboratories, where samples are subjected to various treatments and various measurements made on the same or on different devices, and where the measurement results must be assigned to a common process. In these situations, several samples can be in process simultaneously in the laboratory, which means that the individual values generated in the course of the processes to which the individual samples have been subjected must be assigned to these processes. In addition, the procedures explained above on the basis of shop scales can also occur in other sales devices such as cash registers, in which several purchase prices are entered and the corresponding values generated over the course of one sales process, while an additional sales process is being handled by a different clerk with the same cash register in a chronologically overlapping manner.

The additional keyboard input required to generate the characterizing signals before or after the individual sub-processes is time-consuming and susceptible to error. In addition, the generation of these types of assignment signals should be reserved to trustworthy persons in order to exclude the possibility of misuse. In cases where several devices are linked to form a network and where there are several users, there can also be problems when the number of keys available is not sufficient to give each user his/her own key. In that case, it is necessary to select key combinations to generate the characterizing signals, which means that the user must push several keys each time he completes a sub-process in order to generate the characterizing signals.

In view of the problems of the state of the art explained above, the invention is based on the task of providing an elaboration of the previously described devices which makes it possible for the values generated in the course of the individual processes, especially measurement values or the values determined on their basis, to be assigned quickly and reliably to the individual processes.

According to the invention, this task is accomplished by a device of the type indicated above, which is characterized essentially in that the characterization unit has a receiver to receive the identification signals which are generated in the vicinity of the device during the handling of the individual processes and which identify the individual processes, on the basis of which identification signals the characterizing signals are generated.

As a result of this elaboration, devices of the type described above are given the power of sight, so to speak, so that they themselves are able to recognize the individual sales processes and to send the corresponding identification signals. The receiving unit required for this purpose can be integrated into a housing which also contains the other elements of the device. In addition, however, the idea of the invention also includes the use of separate receivers, which are connected to the other elements of the device by data lines or in a wireless manner.

The invention is based on the surprisingly simple insight that it is no longer necessary for the characterizing signals to be generated by actuation of the appropriate input elements, even in cases where the device is used by several different users, if the identification signals assigned to these users or the identification signals assigned to the individual processes in some other way can be received in the immediate vicinity of the device. The reason for this is that the user or some other signal originator assigned to the process is always present in the vicinity of the device while the individual sub-processes are being handled, whereas all other users or other signal originators will always be farther away from the device, which means that is easy for the identification signals generated by the signal originator active at the time to be distinguished from all the other identification signals.

It is advisable for this purpose to assign to the receiver of the device according to the invention a discriminator, which differentiates between received signals of different origins and/or intensities, and a validator, which recognizes a certain process on the basis of characteristic features of the individual signals which have been discriminated by the discriminator. For this purpose, the characteristic differences which distinguish the identification signals of the various signal originators such as users from each other can be determined and stored over the course of a preceding initialization step. Once the process in question has been recognized on the basis of the identification signals, the values generated during the handling of the process, which are usually the individual measurement results or the purchase prices calculated on the basis of those results, but which can also be control signals indicating the beginning or the end of a process, can be assigned to the process in question automatically without any extra effort.

As can be derived from the previous explanation of the state of the art, the devices according to the invention can have a measuring device, especially a weighing cell, to generate measurement signals such as weight signals. The values in question will then be generated on the basis of these measurement signals or weight signals. The values can represent the measurement result or a result generated on the basis of the measurement result, such as the purchase price of an item of merchandise which has been weighed on a price-calculating scale. It is advisable for the device to have a control unit, which allows it to handle at least two chronologically overlapping processes, at least one of which consists of two sub-processes, in the course of each of which one value is generated.

In an especially advantageous embodiment of the invention, a memory unit is assigned to the control unit. The values are stored in the memory unit in such a way that they are assigned to the processes characterized by the characterizing signals. For this purpose, individual memory areas of the memory unit can be permanently assigned to individual processes. Alternatively or in addition, however, the invention also includes the idea of taking the data corresponding to the characterizing signals and adding these data to the data representing the individual values, a measure which makes it possible for the values to be assigned to the processes characterized by the characterizing signals. As explained above in conjunction with price-calculating shop scales, a device according to the invention also advisably has a control signal-generating unit to generate control signals which represent the beginning and/or the end of a process. This control signal-generating unit can be realized in the form of, for example, an input keyboard.

Once the process has been recognized on the basis of the identification signals, characteristic presets can be proposed in the device for processes of the recognized type; these presets can then be implemented by appropriate actuation of the device or automatically. For this purpose, the control unit of the device is preferably designed in such a way that it can respond to the identification signals or to the characterizing signals generated on the basis of the identification signals by calling up and/or printing out or displaying data assigned to the individual processes and/or by adjusting the device settings to the individual processes.

In addition, it is also possible for the device to be released only for certain processes. In this case, a process can be recognized but rejected, because the device is not released for these types of processes. For example, the device may not be released for use by certain operators. The device can also check the current settings and, as a function of these settings, determine whether a release can occur for the process which has been recognized on the basis of the identification signals.

As already explained above, the individual processes can be assigned to individual operators, such as when, in a retail store, a customer is served by a clerk. In this case, the identification signals are generated by the clerk himself/herself or by a signal transmitter permanently assigned to the clerk. In addition, however, the invention also includes the idea of assigning processes to individual customers who are served by several clerks over the course of the process. For this case, it is especially effective for at least one element such as a container for generating the identification signals, in which container the customer's items are placed, to be assigned to the device. In addition, the invention also includes the idea that the customer himself/herself generates the identification signals.

In principle, the identification signals can be generated without additional means if an appropriate evaluation unit is assigned to the receiver of the device according to the invention and if a sufficient amount of relevant data has been collected in advance to allow the characterizing signals to be generated on the basis of the identification signals. For example, the typical field deformation of the received signal caused by the heat radiating from the hand of the clerk could be detected, or the individual pattern of the weave of a shopping basket, the color of the shopping basket, and/or the surface properties of the shopping basket could be used to generate the identification signals. Evaluation units which are called upon to differentiate a large number of processes from each other with a high degree of reliability, however, are expensive. A simpler method of generating the characterizing signals on the basis of the identification signals is to allow accompanying objects such as specially colored objects to generate the identification signals. Thus, for example, the sales clerk could wear a special finger ring, which could be used to generate the corresponding identification signals.

In this context, it has been found to be especially effective to assign one or more identification signal-generating transmitters to the receiver of the device. In this case, the transmitter can be designed in the form of a transponder, which generates the identification signals in response to signals received by a transmitting unit in the device. The transponder and the transmitting unit in the device can be precisely coordinated to work together in such a way that numerous processes can be recognized very reliably with simple, low-cost equipment and with low transmitting power. The transmitter or transponder assigned to the receiver can, for example, be realized in the form of a finger ring or bracelet.

A network of devices according to the invention advisably has means for allowing the interchange of data among these devices and a central unit, preferably formed by one of the devices, by means of which the values generated by the devices and assigned to the individual processes can be called up, printed out or displayed, and/or sent for further processing to a separate system. At least two devices of the network can each have a transmitting unit, at least one transponder being assigned to these transmitting units to generate the identification signals in response to the signals transmitted by the transmitting units.

When a network according to the invention is used, the handling of the individual processes is not tied to a single device, because, thanks to the production of the characterizing signals or the validation of the corresponding processes during each individual sub-process, the values can be assigned to the correct process even if a different device is used. It is also possible, furthermore, to compile a plurality of processes at a later time at a special location in the network provided for this purpose, which can also be any one of the networked devices desired. This procedure can, for example, be used to evaluate all together all of the sub-processes of the single shopping process of one and the same customer who shopped at different locations, e.g., the items sold to the customer at the meat counter, at the vegetable counter, and at the delicatessen stand, or to produce a statistical record at the end of the day of the processes handled by a specific person.

In a network according to the invention, it is especially advantageous to use transponders to generate the identification signals which identify the individual processes, because, in a network of this type, it is usually necessary to keep several processes or several users of the system apart. In addition, it can be necessary to introduce approval restrictions in the network for certain processes on certain devices. This can be done with greater reliability by the use of transponders. The invention is explained below on the basis of an example of a network of shop scales according to the invention. The explanation is not to be understood as a limitation of the scope of the invention to this example.

In a shop in which a customer can buy food products in a self-service manner, staffed sales islands are present for the sale of unprepackaged cheese, fresh meat, delicatessen items, etc. These islands are equipped with one or more price-calculating shop scales. The customer independently selects the fruits and vegetables and weighs the items on one of the scales provided. The scales at the sales islands are equipped with transmitting/receiving units and evaluation circuits. The transmitting/receiving unit and the associated evaluation circuit can be set up as a free-standing unit near the part of the scale containing the weighing cell, or they can be integrated into an appropriate housing. The person operating the scale carries a transponder, which is tuned to work with the transmitting/receiving unit. The evaluation circuit is able to keep the transponder-modified signals of the transmitting/receiving unit apart and to recognize with great reliability which transponder happens to be in the vicinity at the moment in question. The transponder is advantageously incorporated into a finger ring, for example, or into a bracelet, so that each time the clerk's hand approaches the scale, the identification signals generated by the transponder can be received. A similar type of scale can also be provided at a checkout station located at the exit of the self-service shop.

A customer who wants to buy cheese will approach a sales clerk. The clerk will initiate a new process on the scale by actuating an operating key, for example. Because the device according to the invention automatically recognizes the clerk or the sales process assigned to this clerk, the clerk does not need to enter or to assign any other information, because the appropriate identification signals are automatically received and evaluated by the device.

For safety's sake, however, the scale can display the identity of the person whom it has just recognized. If, unexpectedly, the clerk is not identified correctly on the basis of the identification signals originating from him/her, corrective measures can then be taken. The clerk now lays the various pieces of cut cheese, i.e., the material to be weighed, on the scale and determines measurement values representing the weights of the pieces and thus generates additional values, especially the prices calculated on a weight basis. These individual sub-processes are completed by actuation of an entry key. Each of the completed sub-processes is assigned automatically to the same overall process on the basis of the identification signal being transmitted by the clerk. After the clerk has completed one weighing operation, he/she may then proceed to prepare the next item to be weighed. During this time, another clerk can use the same scale in the same way. While the first clerk is still preparing the next piece of cheese, the second can initiate a new process and perform the first weighing operation for it. The device according to the invention automatically recognizes, on the basis of the identification signals being received from the second clerk, that the process now underway is a different process. The scale will then be able to assign the weights in question to the appropriate individual process.

The cheese sales island can have two or more scales, which are linked together. This network can store data from the scales and exchange these data among themselves. This allows the first clerk to use a different scale for the next piece of cheese if the original scale, i.e., the one on which he initiated the process, happens to be occupied. This procedure, too, can be handled on a network according to the invention with devices according to the invention. The additional scale receives the identification signals coming from the clerk in question, such as the identification signals generated by means the transponder being worn by the clerk, and can then, thanks to the data exchange over the network, assign the values generated in the course of the sub-process executed at this other scale to the process initiated at the first scale. By actuating a corresponding key on the input keyboard, e.g., by actuating the "Total" key, a control signal can be generated, which indicates that the process has been completed.

In another embodiment of the invention, either the shopping baskets are provided with transponders, or a transponder in the form of a coated card, for example, is given to each customer. The shopping baskets or the cards are made available at the locations provided for the purpose at the sales islands. The process is defined by the customer himself/herself or by his/her shopping basket or his/her card. There is no point, at first, in changing the scale or in handling another process on the same scale. In contrast, however, the advantage is to be found in a network of devices. At the exit, the customer's transponder is identified again when the shopping basket or the card is brought into the appropriate position. The devices are linked together in such a way that at least one device at the exit can call up all the sub-processes handled at the other devices in the network in association with the transponder which has just then been identified. All of the sub-processes for this customer or transponder can thus be totaled. This procedure offers the additional advantage that the customer is in fact charged for all the merchandise he has chosen. Otherwise, he could smuggle one of his/her purchases, e.g., the cheese, which he intentionally or by mistake has already placed in his/her shopping bag, past the cash register.

Of course, the embodiments of the invention explained above can also be combined with each other. The customer transponders and the clerk transponders can belong to separate classes. The devices such as the shop scales can then identify a process either on the basis of information associated with the customer or on the basis of information associated with the clerk. The customer's transponder will then be required at the sales island only to initiate the process; after that, everything else proceeds as described above with the clerk's transponder. The totaling of all the sub-processes, however, is based on the identification of the customer's transponder. It would also be possible to compile data on a clerk-specific basis from the network, e.g., to establish the number of sub-processes handled by an individual clerk by the end of the day.

What is claimed is:

1. A weighing device comprising a weighing cell for generating weight signals, on the basis of which at least one value is generated for handling individual processes, in the course of which at least one value is generated, with a characterization unit which can be operated to generate characterizing signals for characterizing the individual processes and with a unit for assigning the values generated during the handling of the individual processes to the processes characterized by the characterizing signals, wherein the weighing device comprises a control unit which allows the weighing device to handle at least two sub-processes, in the course of each of which a value is generated and the characterization unit has a receiver for receiving the identification signals which are generated in the vicinity of the device during the handling of the individual processes and which identify the processes, on the basis of which identification signals the characterizing signals are generated.

2. Weighing device according to claim 1, wherein the control unit is provided with a memory unit, in which the values are filed in such a way that they are assigned to the processes characterized by the characterizing signals.

3. Weighing device according to claim 1, further comprising a control signal-generating unit for generating control signals representing the beginning and/or the end of a process.

4. Weighing device according to claim 1, wherein the characterizing unit has a transmitting unit for transmitting signals which initiate the generation of the identification signals.

5. Weighing device according to claim 1, wherein the control unit can be operated to respond to the characterizing signals by calling up and/or printing out or displaying data assigned to the individual processes and/or by adjusting the settings of the device to the individual processes.

6. Weighing device according to claim 1, wherein at least one element which generates identification signals is assigned to the device.

7. Weighing device according to claim 1, wherein the device can be operated to receive identification signals which identify individual device users who handle the processes.

8. Weighing device according to claim 1, wherein at least one transmitter which generates identification signals is assigned to the receiver.

9. Weighing device according to claim 8, wherein the transmitter is designed as a transponder, which generates the identification signals in response to signals received by the transmitting unit of the device.

10. Weighing device according to claim 8, wherein the transmitter is realized in the form of a finger ring or bracelet.

11. Network weighing of devices according to claim 1 with means for exchanging data between the devices and a central unit, by means of which the values generated in the devices and assigned to the individual processes are called up, printed out or displayed, and/or sent for further processing to a separate system.

12. Network according to claim 11, wherein each of at least two devices has its own transmitting unit, where a transponder is assigned to these transmitting units to generate the identification signals in response to the signals transmitted by the transmitting units.

13. Network according to claim 11, wherein the central unit is formed by one of the devices.

14. Weighing device according to claim 6, wherein the at least one element assigned to the device is a container.

* * * * *